US007289679B2

(12) United States Patent
Prakash

(10) Patent No.: US 7,289,679 B2
(45) Date of Patent: Oct. 30, 2007

(54) SYSTEM AND METHOD FOR MEASURING IMAGE QUALITY USING COMPRESSED IMAGE DATA

(75) Inventor: Ravinder Prakash, Concord, NC (US)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 10/639,371

(22) Filed: Aug. 12, 2003

(65) Prior Publication Data

US 2005/0036693 A1 Feb. 17, 2005

(51) Int. Cl.
*G06K 9/36* (2006.01)
(52) U.S. Cl. ........................................ 382/250; 382/232
(58) Field of Classification Search ................ 382/232, 382/239, 250, 251, 252, 280, 309; 358/479; 348/221.1, 223.1, 229.1
See application file for complete search history.

(56) References Cited

U.S. PATENT DOCUMENTS

| | | | |
|---|---|---|---|
| 4,888,812 A | 12/1989 | Dinan et al. ................. 382/140 |
| 5,295,077 A * | 3/1994 | Fukuoka ..................... 358/479 |
| 5,341,170 A | 8/1994 | Takemoto .................... 348/354 |
| 5,426,512 A | 6/1995 | Watson ........................ 382/250 |
| 5,566,245 A | 10/1996 | Zheng et al. ................ 382/112 |
| 5,629,780 A | 5/1997 | Watson ........................ 382/250 |
| 5,642,433 A | 6/1997 | Lee et al. .................... 382/199 |
| 5,692,065 A | 11/1997 | Prakash et al. ............. 382/112 |
| 5,963,654 A | 10/1999 | Prakash et al. ............. 382/112 |
| 6,344,930 B1 | 2/2002 | Kaneko et al. ............. 359/666 |
| 2001/0015763 A1 | 8/2001 | Miwa et al. ................. 348/345 |
| 2002/0154693 A1 | 10/2002 | Demos et al. .......... 375/240.03 |

\* cited by examiner

*Primary Examiner*—Duy M. Dang
(74) *Attorney, Agent, or Firm*—Douglas A. Lashmit; Hoffman, Warnick & D'Alessandro LLC

(57) ABSTRACT

A system and method for determining image quality by analyzing DCT information. Included is a system for measuring image quality of a compressed image divided into a plurality of blocks, wherein each block has frequency domain components including a DC coefficient value and a plurality of AC coefficient values, the system comprising: a module for analyzing the DC coefficient values from the plurality of blocks to quantify at least one image quality measurement selected from the group consisting of: average brightness, peak brightness, and contrast; and a module for analyzing the AC coefficient values from the plurality of blocks to quantify a focus measurement.

26 Claims, 3 Drawing Sheets

SYSTEM AND METHOD FOR MEASURING IMAGE QUALITY USING COMPRESSED IMAGE DATA

BACKGROUND OF THE INVENTION

1. Technical Field

The present invention relates generally to a system and method for measuring image quality, and more specifically relates to measuring image quality using JPEG DCT coefficient information.

2. Related Art

In order to reduce processing costs, banks and other institutions are seeking to store and process more and more paper documents, including checks, as electronic images. New proposed laws are furthering this movement by, for example, allowing banks to transfer only the check images and associated data for downstream processing. This reduces the requirement for a bank to physically handle and forward paper checks after they are initially received and processed at the bank. However, such scenarios place significant responsibilities on the bank for the integrity of the data and the quality of the images, since the paper checks will not be available to downstream operations.

Because banks are expected to process and exchange thousands of items each day, a fast, automated system for measuring image quality is necessary to ensure that an acceptable image gets captured from each paper document. Various techniques exist for measuring image quality. For instance, U.S. Pat. No. 4,888,812, Document Image Processing System, Issued on Dec. 19, 1989, which is hereby incorporated by reference, discloses the monitoring of image data by determining if an acceptable gray scale distribution, and therefore image quality, exists. After the image is tested, the image is compressed and stored.

Furthermore, in some systems, the image quality must be tested after the image is compressed. Using known techniques, this requires the image to first be decompressed. Because compression protocols, such as JPEG, are relatively lossy, the decompressed image may have artifacts that can lead to compromises in any image quality measurement.

In general, image quality can be measured by examining and quantifying parameters such as the brightness, contrast and/or focus of the image. However, quantifying these parameters from a gray scale image requires significant computational resources. Moreover, because such tests must occur along with compression and decompression routines, providing a fast and efficient system remains an ongoing challenge.

Accordingly, a need exists for a system that can measure image quality with a high degree of accuracy and in a computationally efficient manner.

SUMMARY OF THE INVENTION

The present invention addresses the above-mentioned problems, as well as others, by providing a system and method for measuring image quality by examining frequency domain data in a compressed image. In a first aspect, the invention provides a system for measuring image quality of a compressed image divided into a plurality of blocks, wherein each block has frequency domain components including a DC coefficient value and a plurality of AC coefficient values, the system comprising: a module for analyzing the DC coefficient values from the plurality of blocks to quantify at least one brightness based image quality measurement; and a module for analyzing the AC coefficient values from the plurality of blocks to quantify a focus measurement.

In a second aspect, the invention provides a method for measuring image quality of a compressed image divided into a plurality of blocks, wherein each block has discrete cosine transform (DCT) components including a DC coefficient value and a plurality of alternating current coefficient values, the method comprising: analyzing the DC coefficient values from the plurality of blocks to quantify average brightness, peak brightness, and contrast; and analyzing the AC coefficient values from the plurality of blocks to quantify a focus measurement.

In a third aspect, the invention provides a program product stored on a recordable medium for measuring image quality of a compressed image divided into a plurality of blocks, wherein each block has frequency domain components including a DC coefficient value and a plurality of AC coefficient values, the program product comprising: means for analyzing the DC coefficient values from the plurality of blocks to quantify at least one image quality measurement selected from the group consisting of peak brightness, average brightness and contrast; and means for analyzing the AC coefficient values from the plurality of blocks to quantify a focus measurement.

In a fourth aspect, the invention provides a system for measuring image quality of a compressed image divided into a plurality of blocks, wherein each block has frequency domain components including a DC coefficient value and a plurality of AC coefficient values, the system comprising: a measurement module for analyzing the AC coefficient values from the plurality of blocks to quantify a focus measurement, wherein the measurement module includes an algorithm for calculating a magnitude sum of the first N AC coefficient values from each block, and identifying and summing the highest M magnitude sums.

In a fifth aspect, the invention provides a system for measuring image quality of a compressed image divided into a plurality of blocks, wherein each block has frequency domain components including a DC coefficient value and a plurality of AC coefficient values, the system comprising: a measurement module for analyzing the DC coefficient values from the plurality of blocks to quantify at least one image quality measurement selected from the group consisting of peak brightness, average brightness and contrast.

In a sixth aspect, the invention provides a method for determining acceptability of an electronic image, comprising the steps of: compressing the electronic image such that the electronic image is represented by a plurality of blocks, wherein each block has discrete cosine transform (DCT) components including a DC coefficient value and a plurality of AC coefficient values; analyzing the DCT values to generate at least one measurement that quantifies image quality; comparing the at least one measurement to a predetermined threshold value; and accepting the electronic image if the measurement meets the predetermined threshold value.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

1. Overview

Figure 1:
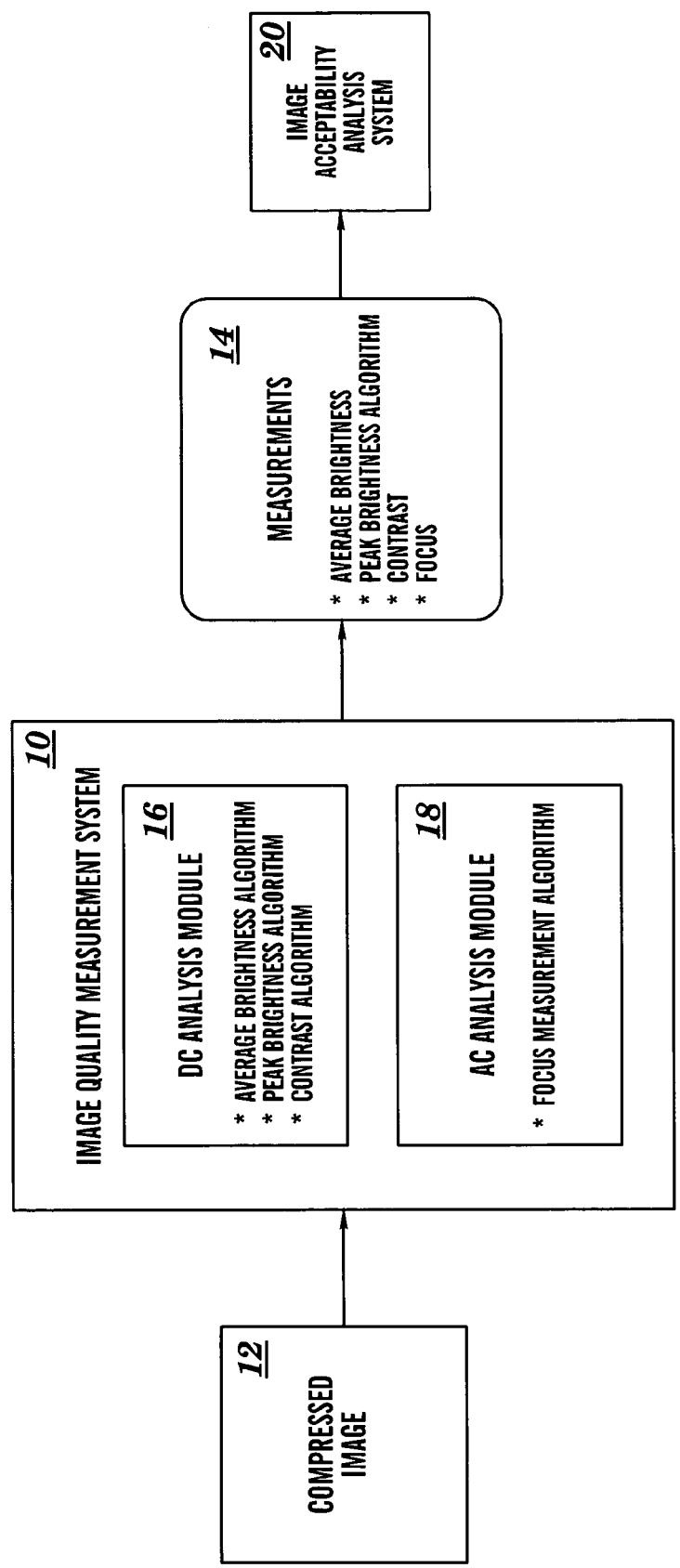
FIG. 1 depicts an image quality measurement system in accordance with the present invention.

Referring now to the drawings, FIG. 1 depicts an image quality measurement system 10 that examines and analyzes a compressed image 12 and outputs a set of measurements 14. For the purposes of describing the invention, compressed image 12 may be described as a gray-scale image compressed using JPEG compression. However, it should be understood that compressed image 12 may comprise any type of image in which the spatial domain information has been transformed into frequency domain information.

In a JPEG image compression process, for instance, the spatial video information is transformed to frequency domain data (i.e., discrete cosine transform or DCT coefficient values), quantized and encoded. Each image is divided into a set of blocks, with each block having 64 (8×8) DCT values. Note that each JPEG block represents a block of 8×8 original pixels. The first DCT component in each block comprises a DC coefficient value that provides an average video value for the block. The remaining 63 DCT components comprise frequency AC coefficient values for the block. The present invention provides image quality measurements by analyzing the DC and AC components.

A DC analysis module 16 is utilized to analyze the DC components and generate a set of brightness-based measurements including: (1) average brightness; (2) peak brightness; and (3) contrast. An AC analysis module 18 is utilized to analyze the AC components and generate a (4) focus measurement.

Once the above measurements are calculated for an image, the measurement values can be compared to predetermined threshold values to determine if the electronic image is acceptable, for instance by image acceptability analysis system 20. Thus, for example, an electronic image of a bank check could be compressed into JPEG format, and then be submitted to image quality measurement system 10 to generate one or more measurements 14, which could then be compared to a set of predetermined threshold values to determine if the electronic image of the check is acceptable.

2. Average Brightness

The average brightness can be computed as the average of all the DC coefficient values for each block of an image. Thus, for example, consider the case of a typical bank check having a raw image size of 957×417 pixels. The resulting JPEG image would have 120×53 (6360) blocks, and each of the blocks would have one DC coefficient value. An average of the DC coefficient values can be readily computed, and the average can then be scaled into a practical range, e.g., 0-255, with 255 representing the maximum value for a pixel.

Figure 2:
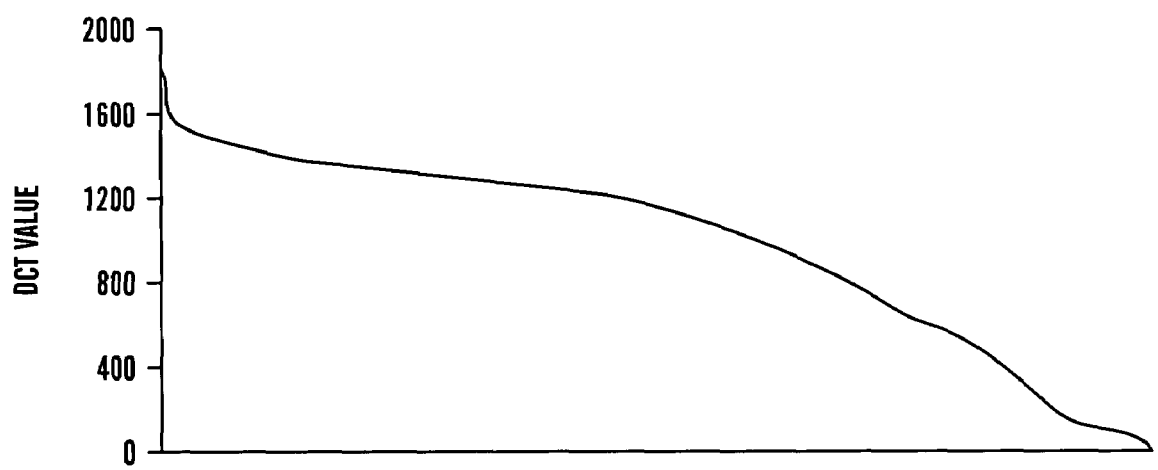
FIG. 2 depicts an exemplary plot of the DC coefficient values for a compressed image in descending order.

FIG. 2 depicts an exemplary plot of descending DC coefficient values for each block of an exemplary bank check. As can be seen, the DC coefficient values range from a high of about 1800 down to a low of about 100. In this case, the average DC coefficient value would be slightly more than 800. The average brightness measurement for the image, after scaling, would end up being 125 out of a maximum value of 255.

3. Peak Brightness

The peak brightness is computed by taking an average of the N highest DC coefficient values for the image. In an exemplary embodiment N=128, however, N can be selected as any integer. Thus, for instance, in the example shown in the FIG. 2, the N highest DC coefficient values would be the first 128 values in the plot. The average of the first 128 values would be 209,105/128=1634, resulting in a scaled value of 205 out of a maximum value of 255 for the peak brightness measurement (assuming a DC coefficient value range of about 100-1800, as noted above).

4. Contrast

Contrast is computed as the difference between the highest and lowest DC video values. In this case, contrast is quantified by taking a difference of: (1) an average of the N highest DC coefficient values from each of the plurality of blocks (i.e., peak brightness), and (2) an average of the N lowest DC coefficient values from each of the plurality of blocks. In the above example, the peak brightness was calculated as 209,105/128=1634, which was scaled to 205. The average of the 128 lowest DC coefficient values, in the example of FIG. 2, would be the average of the 128 rightmost values, namely 19,396/128=151. This result would then be scaled to a value of 19 out of a maximum value of 255. The resulting contrast measurement value would therefore be 205−19=184.

Obviously, the selection of the integer N for the above measurements could be changed or implemented in any manner without departing from the scope of the invention.

5. Focus

Focus quality of an image manifests itself as high video gradients, i.e., an image with high focus quality will have high video gradient values resulting in larger cumulative magnitudes of the frequency components (AC coefficient values). Examining the AC coefficient values, corresponding to the frequency components, provides a measure of video gradient and thus the focus quality. In general, the larger the presence of frequency DCT components (i.e., AC components), the higher the focus quality. Accordingly, the present invention examines the presence and values of the AC components of each block and generates a focus measurement value.

In one exemplary embodiment, a method of computing a focus measurement is accomplished by: (1) summing the magnitudes of the first N (e.g., 16) AC components of each block; (2) placing the magnitude sums for all blocks in descending order; (3) taking the sum of the M (e.g., 128) highest magnitude sums; and (4) normalizing the result, e.g., with respect to an average image brightness.

As noted above, each block of a JPEG image has 63 AC components. The exemplary embodiment sums the magnitude (i.e., disregards the sign) of each of the first 16 AC components to provide a "magnitude sum" for each block. The 128 highest magnitude sums from all of the blocks are then identified and summed to provide a focus measurement. The focus measurement can then be normalized in any manner, e.g., taking an average by dividing by 128. Obviously, the values N=16 and M=128, as well as the selection of AC components, can be altered without departing from the scope of the invention.

Figure 3:
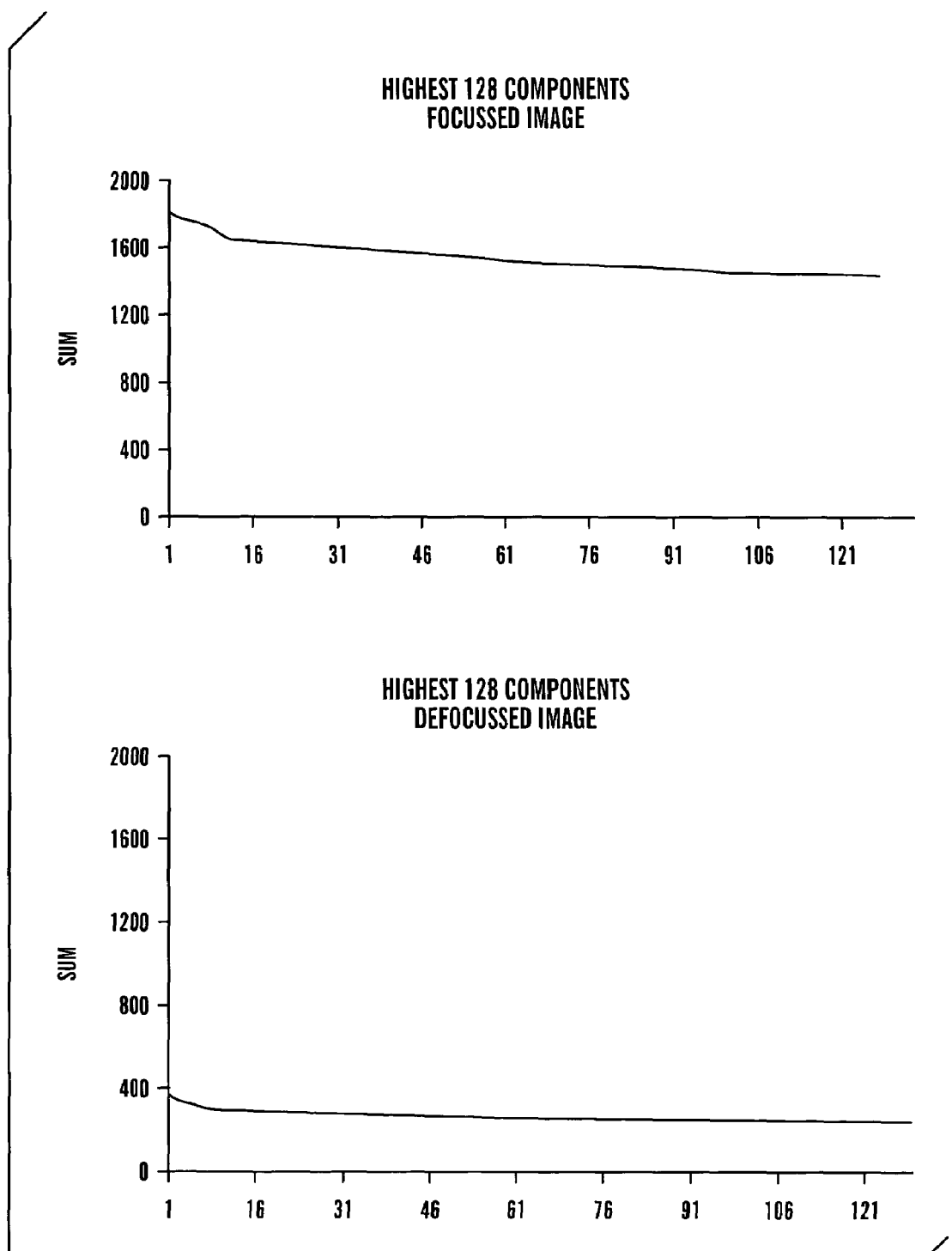
FIG. 3 depicts a pair of exemplary plots of AC coefficient data in accordance with the present invention.

FIG. 3 depicts a pair of graphs showing the first 128 magnitude sums for a highly focused image (top) and an unfocussed image (bottom). As can be seen, the focus measurement for the top graph (i.e., the total of each of the 128 magnitude sums) is substantially greater than the focus measurement for the bottom graph.

It is understood that the systems, functions, mechanisms, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

The invention claimed is:

1. A system for analyzing an image by measuring image quality of a compressed version of the image that has been divided into a plurality of blocks, wherein each block has frequency domain components including a DC coefficient value and a plurality of AC coefficient values, the system comprising:
a module for analyzing the DC coefficient values from the plurality of blocks to quantify at least one brightness based image quality measurement;
a module for analyzing the AC coefficient values from the plurality of blocks to quantify a focus measurement; and
a system for analyzing the at least one brightness based image quality measurement and the focus measurement to determine if the image from which the compressed image is derived is acceptable.

2. The system of claim 1, wherein the at least one brightness based image quality measurement quantifies an average brightness.

3. The system of claim 2, wherein the average brightness is quantified by taking an average of all DC coefficient values from each of the plurality of blocks.

4. The system of claim 1, wherein at least one brightness based image quality measurement quantifies a peak brightness.

5. The system of claim 4, wherein the peak brightness is quantified by taking an average of the highest N DC coefficient values from each of the plurality of blocks, wherein N is a predetermined integer value.

6. The system of claim 1, wherein the at least one brightness based image quality measurement quantifies a contrast.

7. The system of claim 6, wherein the contrast is quantified by taking a difference of an average of the N highest DC coefficient values from each of the plurality of blocks and an average of the N lowest DC coefficient values from each of the plurality of blocks, wherein N is a predetermined integer value.

8. The system of claim 1, wherein the focus measurement is quantified by taking a magnitude sum of the first N AC coefficient values for each block, and identifying and summing the highest M magnitude sums.

9. The system of claim 8, wherein the focus measurement is further quantified by normalizing with respect to an average brightness of the image.

10. The system of claim 1, wherein each DC coefficient value represents an average video value for the block, and each AC coefficient value comprises a frequency component represented as a discrete transform cosine (DCT) value.

11. A method for measuring image quality of a compressed image divided into a plurality of blocks, wherein each block has discrete cosine transform (DCT) components including a DC coefficient value and a plurality of alternating current AC coefficient values, the method comprising:
analyzing the DC coefficient values from the plurality of blocks to quantify average brightness, peak brightness, and contrast, wherein the contrast is quantified by taking a difference of an average of the N highest DC coefficient values from each of the plurality of blocks and an average of the N lowest DC coefficient values from each of the plurality of blocks, wherein N is a predetermined integer value; and
analyzing the AC coefficient values from the plurality of blocks to quantify a focus measurement.

12. The method of claim 11, wherein average brightness is quantified by taking an average of all DC coefficient values from each of the plurality of blocks.

13. The method of claim 11, wherein the peak brightness is quantified by taking an average of the N highest DC coefficient values from each of the plurality of blocks, wherein N is a predetermined integer value.

14. A method for measuring image quality of a compressed image divided into a plurality of blocks, wherein each block has discrete cosine transform (DCT) components including a DC coefficient value and a plurality of alternating current AC coefficient values, the method comprising:
analyzing the DC coefficient values from the plurality of blocks to quantify average brightness, peak brightness, and contrast; and
analyzing the AC coefficient values from the plurality of blocks to quantify a focus measurement, wherein the step of quantifying the focus measurement includes the steps of:
summing the magnitudes of each of the first N AC coefficient values for each block to generate a magnitude sum for each block;
identifying the M highest magnitude sums from all of the magnitude sums; and
summing the M highest magnitude sums.

15. The method of claim 14, comprising the further step of normalizing the focus measurement.

16. The method of claim 15, wherein the step of normalizing the focus measurement includes the step of dividing the focus measurement by a brightness parameter.

17. A program product embodied in computer readable memory for analyzing an original image by measuring image quality of a compressed version of the original image that has been divided into a plurality of blocks, wherein each block has frequency domain components including a DC coefficient value and a plurality of AC coefficient values, the program product comprising:

means for analyzing the DC coefficient values from the plurality of blocks to quantify at least one image quality measurement selected from the group consisting of peak brightness, average brightness and contrast;

means for analyzing the AC coefficient values from the plurality of blocks to quantify a focus measurement; and means for comparing the at least one image quality measurement and the focus measurement to predetermined threshold values to determine if the original image is acceptable.

18. The program product of claim 17, wherein the peak brightness is quantified by taking an average of the highest N DC coefficient values from each of the plurality of blocks, wherein N is a predetermined integer value.

19. The program product of claim 17, wherein the average brightness is quantified by taking an average of all DC coefficient values from each of the plurality of blocks.

20. The program product of claim 17, wherein the contrast is quantified by taking a difference of an average of the N highest DC coefficient values from each of the plurality of blocks and an average of the N lowest DC coefficient values from each of the plurality of blocks, wherein N is a predetermined integer value.

21. The program product of claim 17, wherein the focus measurement is quantified by taking a magnitude sum of the first N AC coefficient values for each block, and identifying and summing the highest M magnitude sums.

22. A system for measuring image quality of a compressed image divided into a plurality of blocks, wherein each block has frequency domain components including a DC coefficient value and a plurality of AC coefficient values, the system comprising:

a measurement module for analyzing the AC coefficient values from the plurality of blocks to quantify a focus measurement, wherein the measurement module includes an algorithm for calculating a magnitude sum of the first N AC coefficient values from each block, and identifying and summing the highest M magnitude sums.

23. The system of claim 22, wherein the measurement module normalizes the focus measurement.

24. A system for measuring image quality of a compressed image divided into a plurality of blocks, wherein each block has frequency domain components including a DC coefficient value and a plurality of AC coefficient values, the system comprising:

a measurement module for analyzing the DC coefficient values from the plurality of blocks to quantify peak brightness, average brightness and contrast, wherein the contrast is quantified by taking a difference of an average of the N highest DC coefficient values from each of the plurality of blocks and an average of the N lowest DC coefficient values from each of the plurality of blocks, wherein N is a predetermined integer value.

25. The system of claim 24, wherein the peak brightness is quantified by taking an average of the highest N DC coefficient values from each of the plurality of blocks, wherein N is a predetermined integer value.

26. The system of claim 24, wherein the average brightness is quantified by taking an average of all DC coefficient values from each of the plurality of blocks.

* * * * *